(12) United States Patent
Sakai et al.

(10) Patent No.: US 7,032,700 B2
(45) Date of Patent: Apr. 25, 2006

(54) OCCUPANT WEIGHT DETECTING DEVICE

(75) Inventors: Morio Sakai, Toyota (JP); Masaki Mori, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 221 days.

(21) Appl. No.: 10/447,239

(22) Filed: May 29, 2003

(65) Prior Publication Data

US 2004/0008119 A1    Jan. 15, 2004

(30) Foreign Application Priority Data

May 29, 2002 (JP) .............................. 2002-156172

(51) Int. Cl.
*B60R 21/32* (2006.01)
(52) U.S. Cl. .................. 180/273; 280/735; 701/45; 702/101; 177/144
(58) Field of Classification Search ................ 180/273; 280/735; 701/45; 702/101; 73/1.13; 177/136, 177/144, 210 R
See application file for complete search history.

(56) References Cited

U.S. PATENT DOCUMENTS

| | | | | |
|---|---|---|---|---|
| 6,080,938 A * | 6/2000 | Lutz | ........................ | 177/25.15 |
| 6,479,766 B1 * | 11/2002 | Gray et al. | .................. | 177/144 |
| 6,643,575 B1 * | 11/2003 | Ishida et al. | .................. | 701/45 |
| 6,759,604 B1 * | 7/2004 | Ishida et al. | ................. | 177/144 |
| 2002/0041236 A1 * | 4/2002 | Sakai et al. | | |
| 2002/0154020 A1 * | 10/2002 | Sumi et al. | | |
| 2003/0216886 A1 * | 11/2003 | Hattori et al. | | |
| 2005/0187686 A1 * | 8/2005 | Wanami et al. | | |

FOREIGN PATENT DOCUMENTS

JP          11-337393 A        12/1999

* cited by examiner

*Primary Examiner*—Randy W. Gibson
(74) *Attorney, Agent, or Firm*—Buchanan Ingersoll PC

(57) ABSTRACT

An occupant weight detecting device includes plural load detecting device and a signal processing device. The plural load detecting device outputs a load signal in response to largeness of load applied to the seat, and the signal processing device sets an occupant load detection range. The signal processing device outputs a variable primary load detection signal based on the load signal in case of the load signal being within the occupant load detection range and a constant secondary load detection signal in case of the load signal being out of the occupant load detection range. The occupant weight detecting device further includes a control device to which the primary load detection signal or the secondary load detection signal is inputted. The control device determines that error is generated on the load detecting device when the signal processing device continues to output the secondary load detection signal during predetermined time.

7 Claims, 6 Drawing Sheets

OCCUPANT WEIGHT DETECTING DEVICE

CROSS REFERENCE TO RELATED APPLICATIONS

The application is based on and claims priority under 35 U.S.C. § 119 with respect to a Japanese Patent Application 2002-156172, filed on May 29, 2002, the entire content of which is incorporated herein by reference.

FIELD OF THE INVENTION

This invention generally relates to an occupant weight detecting device which detects load applied to a seat. More particularly, this invention pertains to error transaction detecting error generated on a load detecting means for detecting the load applied to the seat.

BACKGROUND OF THE INVENTION

Recently, in a vehicle, a number of safety devices has been provided in order to ensure safety of an occupant in case of a traffic accident. In a number of safety devices, an air bag device is a typical safety device.

In the air bag device, an impact generated on the vehicle by a collision is detected by a G-sensor. Based on a signal from the G-sensor, an operating signal for operating the air bag device is inputted to the air bag device which is provided in the center of a steering wheel for a driver or a dashboard panel of a passenger seat. When the operating signal is inputted to the air bag device, an inflator accommodated in the air bag device is ignited. By this ignition, gas for inflating an air bag is expanded. Then the air bag is quickly inflated by the gas, and the occupant sitting on a front seat (for example, the driver seat or the passenger seat) is protected.

For example, in the foregoing air bag device, when a child sits on the seat or a child restraint system (child seat) is mounted to the seat with an infant sitting on, an inflating amount of the air bag needs to be somewhat reduced as compared to the inflating amount of the air bag as an adult sits on the seat.

As a typical occupant weight detecting device for detecting the occupant sitting on the seat, a weight measuring device, which includes a strain gauge provided on the seat for measuring weight of the seat, is known. For example, a known weight measuring device is disclosed in a Japanese Patent Laid-Open Publication No. 11 (1999)-337393. In the weight measuring device disclosed in the foregoing publication, four load detecting sensors are provided on front and rear sides at the bottom of a seat. Each pair of unselective front and rear load detecting sensors is electrically connected to a circuit, and an output from each pair of unselective front and rear load detecting sensors is detected by the circuit. The weight measuring device calculates the weight of the seat based on the output from the circuit.

However, the foregoing load detecting sensors are provided on the seat in the vehicle deferent from a static position, error may be generated on the load detecting sensors due to vibration at running or variation of environment in a vehicle compartment. Thus, when the occupant sitting on the seat is detected by using the defective load detecting sensor, load applied to the seat can not be correctly detected, and the error generated on the load detecting sensor has to be detected.

The present invention therefore seeks to provide an occupant weight detecting device capable of detecting error generated on a load detecting means when load applied to a seat is detected.

SUMMARY OF THE INVENTION

According to an aspect of the present invention, an occupant weight detecting device includes plural load detecting means and a signal processing device. The plural load detecting means is provided at a seat and outputs a load signal in response to largeness of load applied to the seat, and the signal processing device sets an occupant load detection range in which the load applied to the seat can be detected. The signal processing device outputs a variable primary load detection signal based on the load signal in case of the load signal being within the occupant load detection range and a constant secondary load detection signal in case of the load signal being out of the occupant load detection range. The occupant weight detecting device further includes a control device to which the primary load detection signal or the secondary load detection signal is inputted. The control device outputs a control signal based on the load. The control device determines that error is generated on the load detecting means when the signal processing device continues to output the secondary load detection signal during predetermined time.

According to another aspect of the present invention, an occupant weight detecting device includes plural load detecting means and a signal processing device. The plural load detecting means is provided at a seat and outputs a load signal in response to largeness of load applied to the seat, and the signal processing device setting an occupant load detection range in which the load applied to the seat can be detected. The signal processing device outputs a variable primary load detection signal based on the load signal in case of the load signal being within the occupant load detection range and a constant secondary load detection signal in case of the load signal being out of the occupant load detection range. The occupant weight detecting device further includes a control device to which the primary load detection signal or the secondary load detection signal is inputted. The control device outputs a control signal based on the load. The control device calculates variation of the primary load detection signal and determines that error is generated on the load detecting means when a first state in which the variation is smaller than a predetermined threshold A or a second state in which the variation is larger than a predetermined threshold B larger than the predetermined threshold A elapses during predetermined time.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Figure 1:
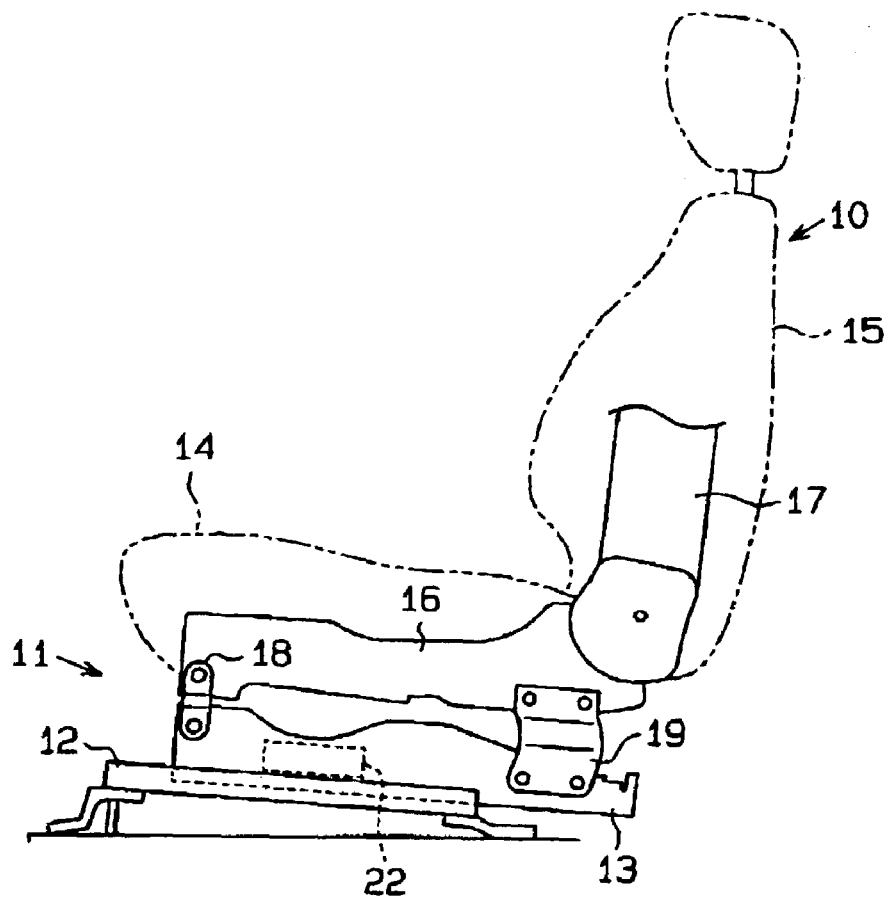
FIG. 1 is a lateral view of a seat according to an embodiment of the present invention.

A seat 10 according to an embodiment of the present invention is provided, for example, as a front seat in a vehicle compartment. As shown in FIG. 1, the seat 10 is movable in a longitudinal direction of the vehicle by a slide mechanism 11.

Generally, structure of the seat 10 is symmetrical. In FIG. 1, one side of the seat 10 is illustrated. Each slide mechanism 11 includes a lower rail 12 and an upper rail 13. The lower rail 12 has an approximately U-shaped cross section with an upward opening. The opening extending in the longitudinal direction of the vehicle forms a guide part. The upper rail 13 supporting the seat 10 is accommodated in the guide part of the lower rail 12 so as to be slidably movable in the longitudinal direction of the vehicle along the lower rail 12. The lower rail 12 is fixed to a vehicle floor (not shown) on end portions thereof by a fastening member such as a bolt.

The seat 10 includes a seat cushion 14 having a sitting part for an occupant and a seat back 15 where the occupant leans. The seat cushion 14 includes seat cushion frames 16 therein, and the seat back 15 includes a seat back frame 17 therein. A front bracket 18 for supporting a front portion of the seat 10 and a rear bracket 19 for supporting a rear portion of the seat 10 are provided between the seat cushion frame 16 and the upper rails 13. A pair of seat cushion frames 16 is connected to the pair of upper rails 13 by using the front brackets 18 and the rear brackets 19.

Figures 2A, 2B:
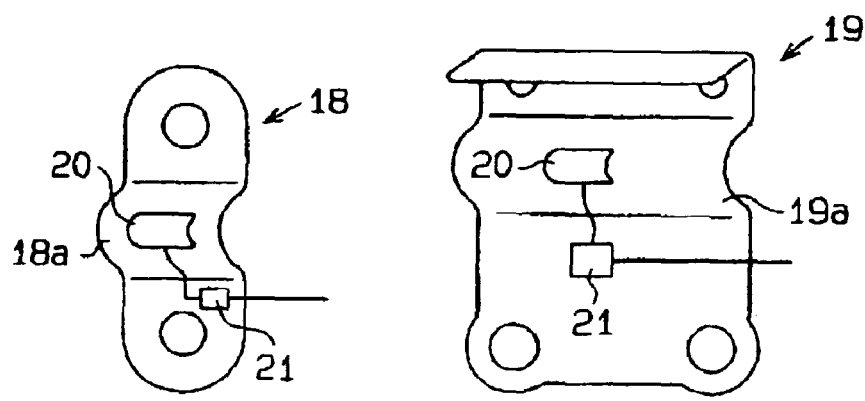
FIG. 2(a) is a perspective view of a front sensor bracket provided on lateral sides of the seat shown in FIG. 1.
FIG. 2(b) is a perspective view of a rear sensor bracket provided on lateral sides of the seat shown in FIG. 1.

As shown in FIG. 2(a), each front bracket 18 is provided with a curved portion 18a. Elastic deformation is generated on the curved portion 18a in response to largeness of load based on weight of the occupant when the occupant sits on the seat 10. The elastic deformation is generated on the curved portion 18a when load within an occupant load detection range is applied to the curved portion 18a. The occupant load detection range shows a range of a predetermined load regarded as load applied to the seat 10 by the occupant.

Each curved portion 18a is provided with a load detecting sensor 20 (a load detecting means). The load detecting sensor 20 outputs a signal in response to deformation of the curved portion 18a. A lower fastening portion of the front bracket 18, which is connected to the upper rail 13, is provided with a signal processing device 21. The signal processing device 21 is electrically connected to the load detecting sensor 20.

On one hand, each rear bracket 19 is provided with a curved portion 19a as same with the front bracket 18. Elastic deformation is generated on the curved portion 19a in response to the largeness of the load applied to the seat 10 as same with the curved portion 18a. The curved portion 19a is provided with the load detecting sensor 20, and a lower fastening portion of the rear bracket 19 is provided with the signal processing device 21 as same with the front bracket 18. The load detecting sensor 20 is electrically connected to the signal processing device 21.

That is, in the embodiment of the present invention, the four load detecting sensors 20 are provided on the curved portion 18a and 19a of the front brackets 18 and rear brackets 19 provided under the seat cushion 14 of the seat 10. The signal transmitted from the load detecting sensor 20 is transacted by the signal processing device 21. The signal processing device 21 is connected to ECU 22 (a control device), and the signal transacted by the signal processing device 21 is inputted to the ECU 22. The ECU 22 is, for example, provided under the seat 10 and connected to an air bag device (not shown) for controlling an air bag for protecting the occupant. In the embodiment, an occupant weight detecting device 1 includes the load detecting sensors 20, the signal processing device 21, and the ECU 22.

Next, electrical structure of the load detecting sensor 20 and the signal processing device 21 is explained below with reference to FIG. 3. In the following explanation, only one of four load detecting sensors 20 and signal processing devices 21 is explained because of similar structure.

The load detecting sensor 20 is electrically connected to the signal processing sensor 21 provided on each lower fastening portion of the brackets 18 and 19. The signal processing device 21 is supplied with reference voltage $V_S$ by the ECU 22, and the reference voltage $V_S$ is supplied to the load detecting sensor 20 through the signal processing device 21. The load detecting sensor 20 detects load applied to the seat 10, and then a load signal corresponding to largeness of the load is generated based on the reference voltage $V_S$. The load signal is inputted to the signal processing device 21.

The load signal, which is inputted to the signal processing device 21 from the load detecting sensor 20, is converted within a predetermined voltage signal in the signal processing device 21 and then inputted to the ECU 22. The ECU 22 calculates the weight of the occupant sitting on the seat 10 based on the load detected by the load detecting sensor 20 and classifies whether the occupant sitting on the seat 10 is an adult or a child based on the weight of the occupant. After that, the ECU 22 generates a control signal for controlling a safety device (for example, an air bag device) based on a type of the occupant previously determined, and the air bag device (not shown) is controlled in response to the control signal.

Next, explanation about the load detecting sensor 20 and the signal processing device 21 is provided below.

In the embodiment, a strain gauge including resistors is applied as the load detecting sensor 20. In the load detecting sensor 20, bridge circuit is formed by four resistors 20a, 20b, 20c, and 20d with same resistance. Series-connected resistors 20a and 20b and series-connected resistors 20c and 20d are connected in parallel, and the reference voltage $V_S$ is applied at both ends. In the load detecting sensor 20, the signal can be detected based on potential difference between the midpoint of the series-connected resistors 20a and 20b and the midpoint of the series-connected resistors 20c and 20d. A differential voltage signal $V_A$ is generated based on the potential difference in response to the deformation of curved portions 18a and 19a. The load detecting sensor 20 has linearity in response to increase in the load within the occupant load detection range shown in FIG. 5, thus the differential voltage signal $V_A$ linearly varying is outputted from the load detecting sensor 20 within the occupant load detection range.

Figure 3:
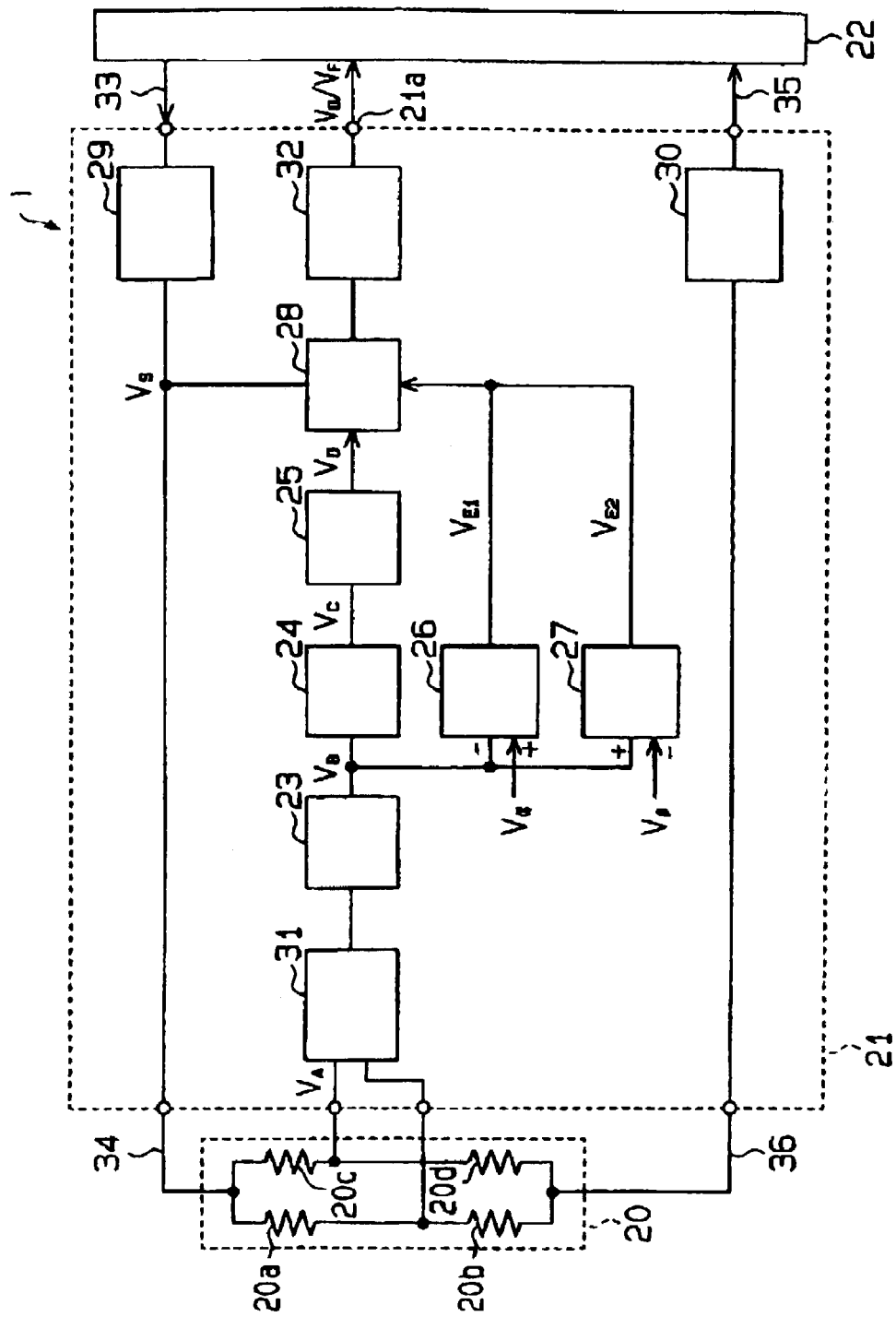
FIG. 3 is a system diagram of an occupant weight detecting device according to the embodiment of the present invention.

FIG. 3 is a block diagram describing inner construction of the signal processing device 21. The signal processing device 21 includes an amplification and adjustment circuit 23, an amplification circuit 24, and a clamp circuit 25. The signal processing device 21 further includes comparators 26 and 27, an output circuit 28, noise filters 29, 30, 31, and 32. The noise filters 29–32 prevent external noise between the load detecting sensor 20 and the signal processing device 21.

A power supply line 33 for supplying the reference voltage $V_S$ from the ECU 22 is connected to the signal processing device 21, and the reference voltage $V_S$ is supplied to the signal processing device 21 through the noise filter 29. The signal processing device 21 supplies the reference voltage $V_S$ to a power side of the load detecting sensor 20 through a power supply line 34. On one hand, a grounding conductor 35 from the ECU 22 is connected to the signal processing device 21 through the noise filter 30. A grounding side of the load detecting sensor 20 is connected to the grounding conductor of the signal processing device 21 through a grounding conductor 36.

The differential voltage signal $V_A$ outputted from the load detecting sensor 20 is inputted to the amplification and adjustment circuit 23 through the noise filter 31. The amplification and adjustment circuit 23 amplifies the differential voltage signal $V_A$ and then generates a voltage signal $V_B$ with zero point and sensitivity being adjusted. This voltage signal $V_B$ is inputted to the amplification circuit 24 and the two comparators 26 and 27.

When the voltage signal $V_B$ is inputted to the amplification circuit 24, the amplification circuit 24 generates voltage signal $V_C$ by amplifying the voltage signal $V_B$. The voltage signal $V_C$ generated by the amplification circuit 24 is inputted to the clamp circuit 25. The amplification circuit 24 amplifies the voltage signal $V_B$ up to voltage within the reference voltage $V_S$ in response to the occupant load detection range set so as to output a linear output.

Figure 5:
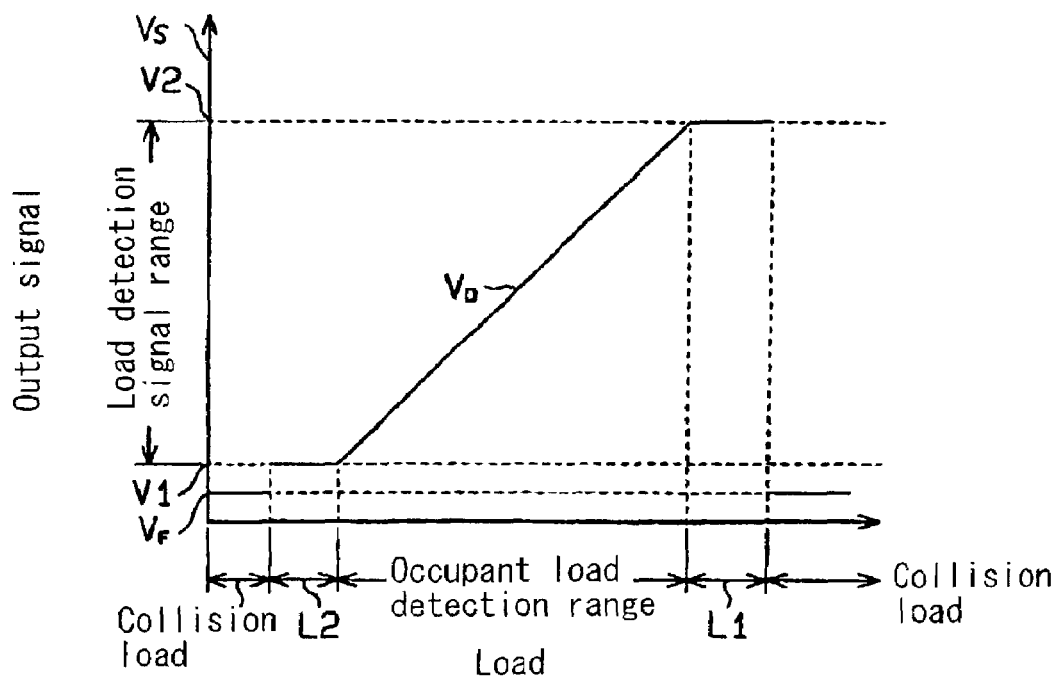
FIG. 5 is a graph describing output from a signal processing device shown in FIG. 3.

The clamp circuit 25 clamps the voltage signal $V_C$ at an upper limit and a lower limit corresponding to the occupant load detection range. In the embodiment, as shown in FIG. 5, a load detection signal $V_D$, which is a variable voltage signal clamping the voltage signal $V_C$ at the lower limit voltage V1 or more being close in value to ground voltage and at the upper limit voltage V2 or more being close in value to the reference voltage $V_S$, is outputted. The load detection signal, which varies with linearity in response to the largeness of the load, is a primary load detection signal, and the constant lower limit voltage V1 and the constant upper limit voltage V2, which has non-linearity free from the largeness of the load, are a secondary load detection signal.

The comparator 26 outputs a low-potential determination signal $V_{E1}$ to the output circuit 28 when the voltage signal $V_B$ outputted from the amplification and adjustment circuit 23 is reference voltage Vα or more. On one hand, when the voltage signal $V_B$ is smaller than the reference voltage Vα, the comparator 26 outputs a high-potential determination signal $V_{E1}$. The reference voltage Vα is generated based on the reference voltage $V_S$ and set to be a value of the voltage signal $V_B$ corresponding to a positive load value being larger than an upper limit in the occupant load detection range by a steady value (L1). The value is larger than that of the voltage signal $V_B$ as the voltage signal VC outputted from the amplification circuit 24 is upper limit voltage V2. The reference voltage Vα is set to determine that excessive load over the upper limit V2 of the occupant load detection range is applied to the load detecting sensor 20.

The comparator 27 outputs a high-potential determination signal $V_{E2}$ to the output circuit 28 when the voltage signal $V_B$ outputted from the amplification and adjustment circuit 23 is reference voltage Vβ (smaller than Vα) or more. On one hand, when the voltage signal $V_B$ is smaller than the reference voltage Vβ, the comparator 26 outputs a low-potential determination signal $V_{E2}$ to the output circuit 28. The reference voltage Vβ is generated based on the reference voltage $V_S$ and set to be a value of the voltage signal $V_B$ corresponding to a negative load value being smaller than an lower limit in the occupant load detection range by a steady value (L2). The value is smaller than that of the voltage signal $V_B$ as the voltage signal $V_C$ outputted from the amplification circuit 24 is lower limit voltage V1. The reference voltage Vβ is set to determine that very small load under the lower limit V1 of the occupant load detection range is applied to the load detecting sensor 20.

Figure 4:
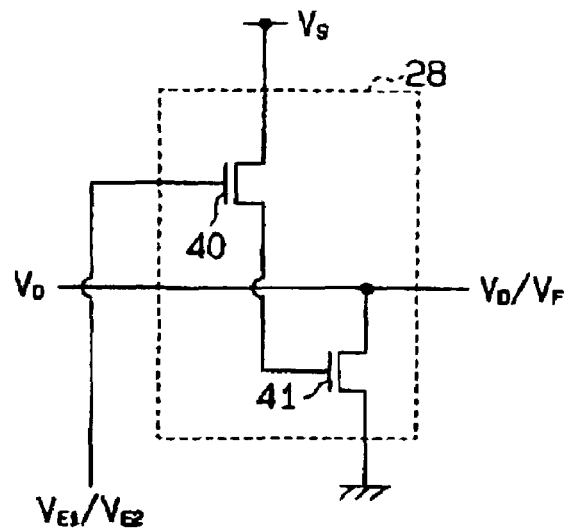
FIG. 4 is an electrical diagram describing an output circuit shown in FIG. 3.

As shown in FIG. 4, the output circuit 28 includes two switching elements, P-channel FET 40 (hereinafter referred to as PFET 40) and N-channel FET 41 (hereinafter referred to as NFET 41) performing switching operation in response to state of determination signals $V_{E1}$ and $V_{E2}$ outputted from the comparators 26 and 27.

In the PFET 40, as shown in FIG. 4, drain is connected to the reference voltage $V_S$, and source is connected to gate of the NFET 41. Gate of the PFET 40 is connected to output sides of the comparators 26 and 27. Drain of the NFET 41 is connected to an output side of the clamp circuit 25, which corresponds to an output side of the output circuit 28. Source of the NFET 41 is grounded. In the foregoing structure, the PFET 40 is "ON" and the NFET 41 is "OFF" if either of the determination signals $V_{E1}$ and $V_{E2}$ in low potential. On one hand, if both determination signals $V_{E1}$ and $V_{E2}$ are in high potential or low potential, the PFET 40 is "OFF" and the NFET 41 is "ON".

The output circuit 28 outputs the load detection signal $V_D$ to an output terminal 21a of the signal processing device 21 by the clamp circuit 25 if both determination signals $V_{E1}$ and $V_{E2}$ are in high potential. On one hand, the output circuit 28 outputs a defective load signal $V_F$ with voltage approximately corresponding to ground potential to the output terminal 21a of the signal processing device 21. In this case, the defective load signal $V_F$ is set to be voltage of 0.2V or less by voltage drop of the NFET 41.

As explained above, the signal processing device 21 outputs the load detection signal $V_D$ having linearity from the lower limit voltage V1 to the upper limit voltage V2 when the load applied to the seat is within the predetermined occupant load detection range.

The signal processing device 21 outputs the defective load signal $V_F$ being smaller than the lower limit voltage V1 when the load applied to the load detecting sensor 20 is collision load which is set as positive load range where the load applied to the load detecting sensor 20 is a value or more being larger than the upper limit of the occupant load detection range by the value L1 or collision load which is set as load range where the load applied to the load detecting sensor 20 is the lower limit voltage V1 or less. Similarly, the signal processing device 21 outputs the defective load signal $V_F$ when the load applied to the load detecting sensor 20 is collision load which is set as negative load range where the load applied to the load detecting sensor 20 is a value or less being smaller than the lower limit of the occupant load detection range by the value L2. The load detection range set to be larger than the occupant load detection range by the load value L1 and L2 is provided in order not to determine that the collision load is applied to the load detecting sensor 20 when the load detected by the load detecting sensor 20 increases or decreases by sudden acceleration and full braking and out of the occupant load detection range.

When the occupant sits on the seat 10, the differential voltage signal $V_A$ is generated based on the load detected by the load detecting sensor 20. The differential voltage signal $V_A$ is inputted to the signal processing device 21 connected to the ECU 22. Finally, the differential voltage signal $V_A$ is outputted as the load detection signal $V_D$ through the output terminal 21a of the signal processing device 21. When the load detection signal $V_D$ is inputted to the ECU 22, the ECU 22 calculates the weight of the occupant sitting on the seat 10 based on the load detection signal $V_D$. In this case, when the defective load signal $V_F$ is inputted to the ECU 22 from any signal processing device 21, control of the air bag device based on the weight of the occupant is restricted, and control only based on collision acceleration.

Next, operation of the occupant weight detecting device 1 explained below.

When the occupant sits on the seat 10, the load is applied to the front brackets 18 and the rear brackets 19 supporting the seat 10 in response to the weight of the occupant. The load is also applied to the curved portions 18a and 19a, and then the elastic deformation is generated on the curved portions 18a and 19a. Thus, each load detecting sensor 20, which is provided on the curved portions 18a and 19a of the front brackets 18 and the rear brackets 19 respectively, is deflected. Then the load detecting sensor 20 outputs the differential voltage signal $V_A$ to the signal processing device 21 in response to the amount of elastic deformation.

When an ignition switch (not shown) of the vehicle is turned on, and when the electrical power is supplied to the ECU 22, the signal processing device 21 generates the load detection signal $V_D$ corresponding to the largeness of the load based on the differential voltage signal $V_A$ inputted from the load detecting sensor 20. The load detection signal $V_D$ is inputted to the ECU 22. However, when a collision is generated at running or halt, a collision signal is generated based on the weight of the occupant and acceleration applied to the occupant and the seat 10 due to the collision. That is, in case of the collision, excessive load is applied to the curved portions 18a and 19a of the front brackets 18 and the rear brackets 19, and the excessive load is detected by the load detecting sensor 20. Then the signal processing device 21 outputs the defective load signal $V_F$ to the output terminal 21a of the signal processing device 21 when the largeness of the load applied to the load detecting sensor 20 corresponds to the excessive collision load.

Even if acceleration at a collision is relatively small, and if the air bag device is not operated, when the weight of the occupant approximately corresponds to the upper limit value of the occupant load detection range, and when the load detected by the load detecting sensor 20 corresponds to a collision load larger than the upper limit L1 of the occupant load detection range, the defective load signal $V_F$ is outputted. Further, if the air bag device is not operated, when the weight of the occupant approximately corresponds to the lower limit value V1 of the occupant load detection range, and when the load detected by the load detecting sensor 20 corresponds to a collision load smaller than the lower limit L2 of the occupant load detection range, the defective load signal $V_F$ is outputted. Thus, defective deformation of the curved portions 18a and 19a of the front bracket 18 and the rear bracket 19, which is generated by defective load being out of the occupant load detection range which is set on each load detecting sensor 20, can be detected surely.

Next, a series of transaction performed by the ECU 22 is explained below with reference to a flow chart shown in FIG. 6. In the following explanation, "step" at each transaction is referred to as "S".

Figure 6:
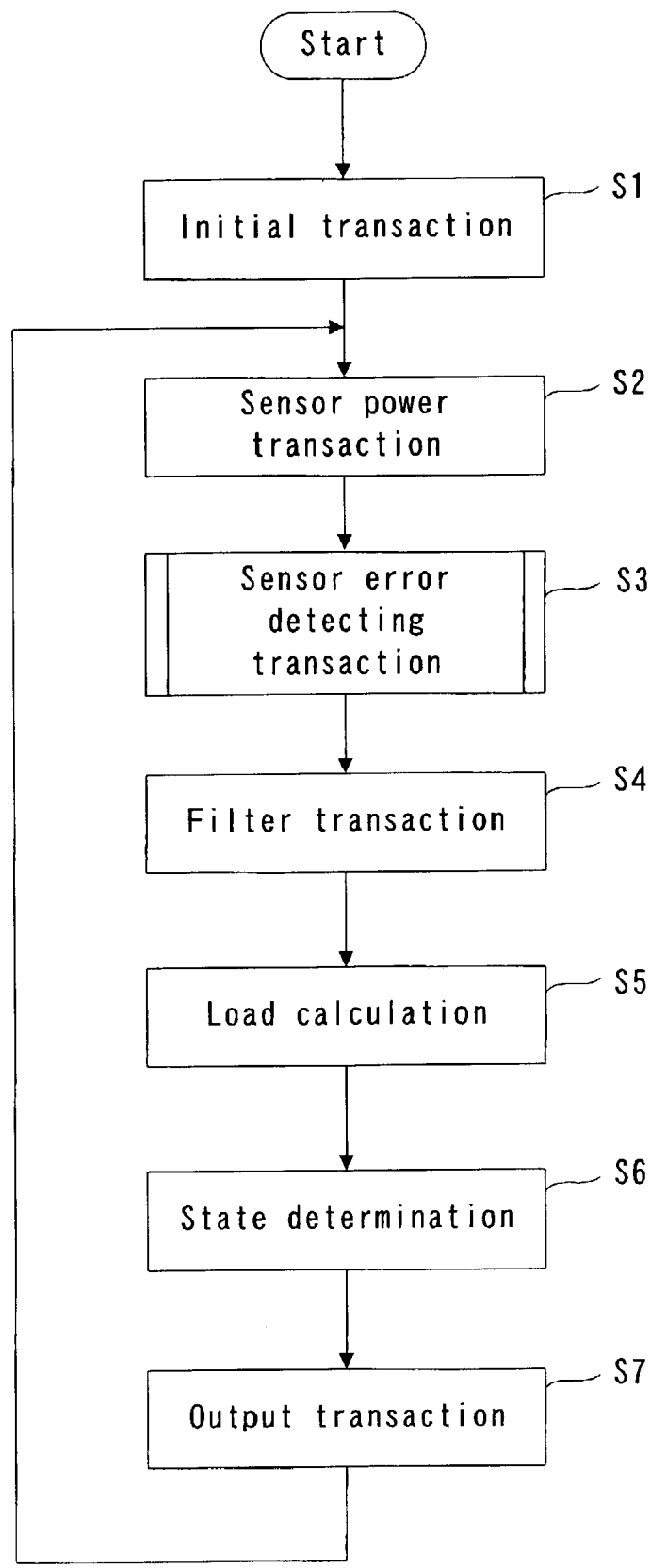
FIG. 6 is a flow chart describing a series of transaction performed by ECU shown in FIG. 3.

When the ignition switch is turned on, and when the electrical power is supplied to the ECU 22, The ECU 22 performs the transaction shown in FIG. 6. At the beginning, initial transaction at S1 is performed. In the transaction at S1, the ECU 22 checks whether or not an inside memory of the ECU 22 can normally memorize an inputted data. After the memory check, the ECU 22 sets an initial value to a predetermined memory and performs an initial setup. The initial value is needed in order to perform the transaction subsequently.

After that, the transaction proceeds to S2. In sensor input transaction at S2, sensor power (reference voltage $V_S$) is supplied to each load detecting sensor 20 through the signal processing device 21. Then the signal detected by the load detecting sensor 20 is inputted to the ECU 22 through the signal processing device 21. The ECU 22 performs sensor failure detecting transaction described later based on the signal. At the sensor failure detecting transaction, for example, when something is wrong with the signal from the load detecting sensor 20, the ECU 22 set a sensor error flag, and specific failure transaction can be set to be performed in the sensor failure detecting transaction. On one hand, when the signal from the load detecting sensor 20 is normal, the transaction proceeds to S4, filter transaction at S4 is performed. In the filter transaction at S4, with reference to the load detection signal VD detected by the load detecting sensor 20, filtering is performed in order to prevent influence of the noise on the load detection signal VD is prevented. After that, load calculation at S5 is performed based on the load detection signal VD after filtering. In the load calculation at S5, total load is calculated by the sum of four load detection signals detected by the load detecting sensors 20 provided on the seat 10. Next, in state determination at S6, the ECU 22 determines whether the occupant sitting on the seat 10 is the adult or the child based on the total load calculated at S5 or variation of the load at connection of a seat belt. After that, output transaction is performed at S7 based on the state determined at S6. A series of the foregoing transaction from S2 to S7 is repeated with a predetermined cycle. At the output transaction at S7, for example, when the occupant weight detecting device 1 is applied to the air bag device, a driving signal for the air bag, which is controlled so that an inflating amount of the air bag can be controlled in response to the state determined at S6, is outputted.

Figure 7:
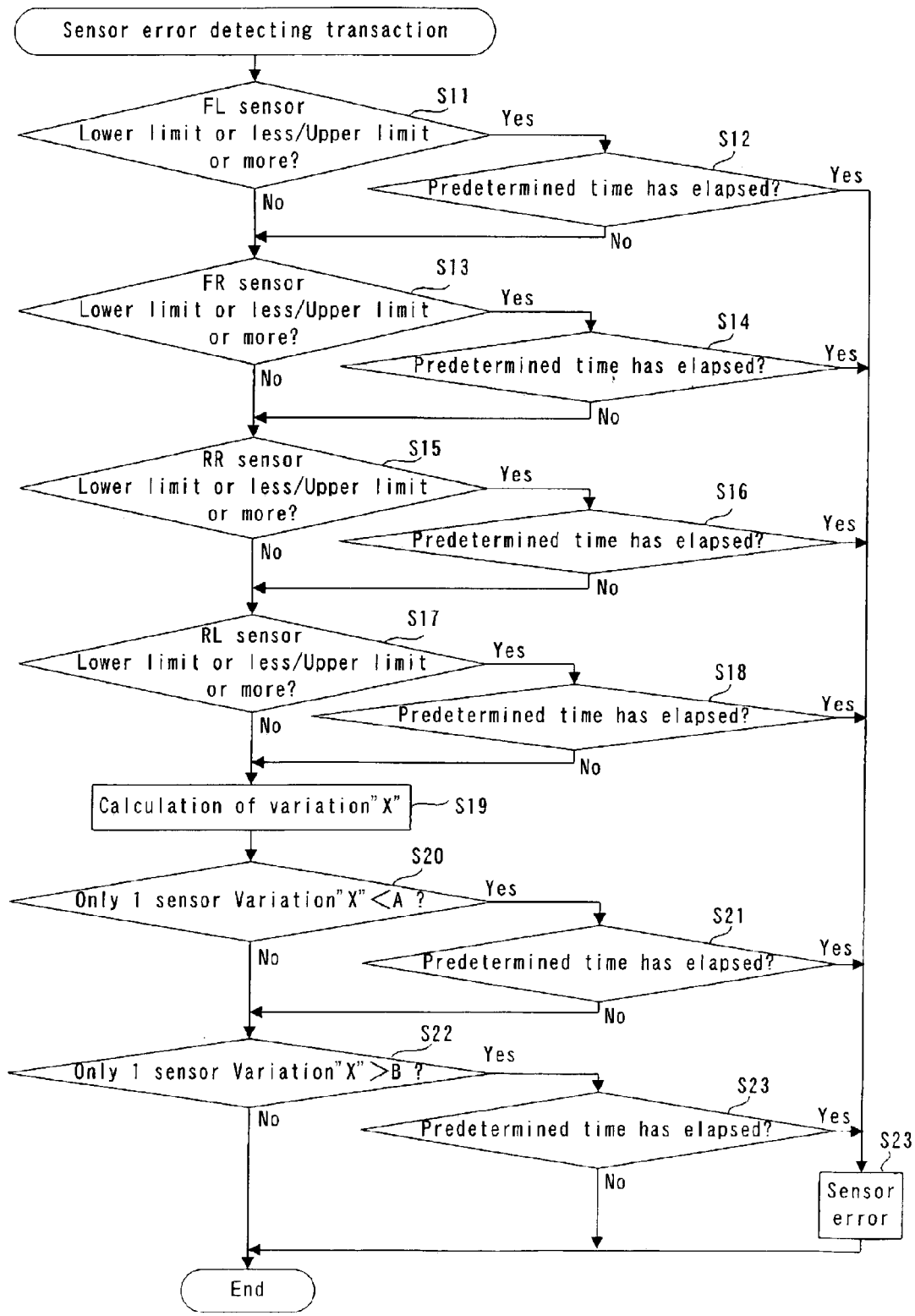
FIG. 7 is a flow chart describing sensor error detecting transaction shown in FIG. 6.

A series of the transaction performed by the ECU 22 is explained above, next, the sensor error detecting transaction is explained below with reference to FIG. 7.

At S11, error determination about a front right-hand side sensor (hereinafter referred to as FR sensor) in four load detecting sensors 20 is performed. The transaction at S11 initially determines whether or not the load detection signal from the FR sensor inputted to the ECU 22 is the upper limit voltage V2 or more, or whether or not the load detection signal from the FR sensor is the lower limit voltage V1 or less being out of the occupant load detection range (condition 1). If the condition 1 is not true, the transaction proceeds to S13. If the condition 1 is true, the transaction proceeds to S12.

At S12, the transaction determines whether predetermined time elapses under the condition 1. If the predetermined time does not elapse, the transaction proceeds to S13. If the predetermined time elapses, the transaction determines that the FR sensor continues to output an error detecting signal continuously. After that, at S24, the sensor error flag is set to the FR sensor, then the transaction returns to main routine shown in FIG. 6.

At S13, the error determination about a front left-hand side sensor (hereinafter referred to as FL sensor) in four load detecting sensors 20 is performed. The transaction at S13 determines whether or not the load detection signal from the FL sensor inputted to the ECU 22 is the upper limit voltage V2 or more, or whether or not the load detection signal from the FL sensor is the lower limit voltage V1 or less being out of the occupant load detection range (condition 2). If the condition 2 is not true, the transaction proceeds to S15. If the condition 2 is true, the transaction proceeds to S14.

At S14, the transaction determines whether the predetermined time elapses under the condition 2. If the predetermined time does not elapse, the transaction proceeds to S15. If the predetermined time elapses, the transaction determines that the FL sensor continues to output the error detecting signal continuously. After that, at S24, the sensor error flag is set to the FL sensor, then the transaction returns to main routine shown in FIG. 6.

At S15, the error determination about a rear right-hand side sensor (hereinafter referred to as RR sensor) in four load detecting sensors 20 is performed. The transaction at S15 determines whether or not the load detection signal from the RR sensor inputted to the ECU 22 is the upper limit voltage V2 or more, or whether or not the load detection signal from the RR sensor is the lower limit voltage V1 or less being out of the occupant load detection range (condition 3). If the condition 3 is not true, the transaction proceeds to S17. If the condition 3 is true, the transaction proceeds to S16.

At S16, the transaction determines whether the predetermined time elapses under the condition 3. If the predetermined time does not elapse, the transaction proceeds to S17. If the predetermined time elapses, the transaction determines that the RR sensor continues to output the error detecting signal continuously. After that, at S24, the sensor error flag is set to the RR sensor, then the transaction returns to main routine shown in FIG. 6.

At S17, the error determination about a rear left-hand side sensor (hereinafter referred to as RL sensor) in four load detecting sensors 20 is performed. The transaction at S17 determines whether or not the load detection signal from the RL sensor inputted to the ECU 22 is the upper limit voltage V2 or more, or whether or not the load detection signal from the RL sensor is the lower limit voltage V1 or less being out of the occupant load detection range (condition 4). If the condition 4 is not true, the transaction proceeds to S19. If the condition 4 is true, the transaction proceeds to S18.

At S18, the transaction determines whether the predetermined time elapses under the condition 4. If the predetermined time does not elapse, the transaction proceeds to S19. If the predetermined time elapses, the transaction determines that the RL sensor continues to output the error detecting signal continuously. After that, at S24, the sensor error flag is set to the RL sensor, then the transaction returns to main routine shown in FIG. 6.

Figure 8A:
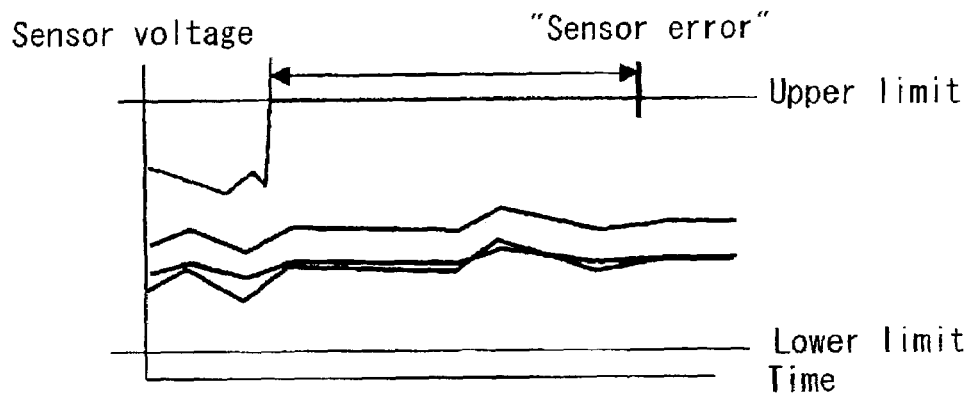
FIG. 8 is a graph for describing the sensor error detecting transaction shown in FIG. 7.

That is, in a series of the transaction from S11 to S18, the load detection signals form the load detecting sensors 20 is checked in sequence, the transaction determines whether the predetermined time elapses with the error detecting signal being outputted continuously. Further, when the predetermined time elapses under the foregoing condition, the transaction determines that the output from the signal processing device 21 is constant with no variation. Thus, the sensor error can be detected by the observing the variation of the load detection signal as shown in FIG. 8(a).

After that, the transaction proceeds to S19. In the transaction at S19, variation "X" is calculated. In calculation of the variation "X", the following transaction is performed.

That is, each load difference in a predetermined time is calculated based on the load detection signals from the load detecting sensors 20. More specifically, in this calculation, the load detection signal having been detected by a predetermined time before is memorized to the memory in time-series every predetermined cycle for detecting the load. The difference between a maximum value and a minimum value in the predetermined cycle is regarded as the variation "X". The calculation at S19 determines whether or not one variation "X" is very smaller than another variation "X" and than a predetermined threshold A for determining the sensor error (condition 5, a first state). If the condition 5 is not true, the transaction proceeds to S22. If the condition 5 is true, the transaction proceeds to S21. In transaction at S21, in order for the sensor error due to the noise not to be determined, the transaction determines whether or not a predetermined time elapses under the condition 5. If the predetermined time does not elapse, the ECU 22 does not determines that the foregoing state corresponds to the sensor error, and then the transaction proceeds to S22. If the predetermined time has elapsed, the transaction proceeds to S24, and then the transaction determines that the sensor error is generated on the load detecting sensor 20 where the condition 5 is true. After that, the sensor error flag is set to the foregoing load detecting sensor 20 at S24, then the transaction returns to main routine shown in FIG. 6.

After that, the transaction proceeds to S22. The calculation at S22 determines whether or not one variation "X" is larger than a predetermined threshold B (larger than the predetermined threshold A) (condition 6, a second state). That is, at S20, the sensor error is detected by the variation "X" of the load detection signal very smaller than another variation "X". This time, the sensor error is detected by the variation "X" of the load detection signal very larger than another variation "X". That is, if the condition 6 is not true, the sensor error detecting transaction is ended, and then the transaction returns to the main routine shown in FIG. 6. If the condition 6 is true, the transaction proceeds to S23. At S23, the transaction determines whether or not the predetermined time has elapsed under the condition 6. If the predetermined time has not elapsed under the condition 6, the transaction does not determine that the foregoing state corresponds to the sensor error. After that, the sensor error detecting transaction is ended, then the transaction returns to the main routine. If the predetermined time has elapsed under the condition 6, the transaction proceeds to S24 and determines that the sensor error is generated on the load detecting sensor 20 where the foregoing condition is true. After that, the sensor error flag is set to the foregoing load detecting sensor 20 at S24, then the transaction returns to the main routine shown in FIG. 6.

Figure 8B:
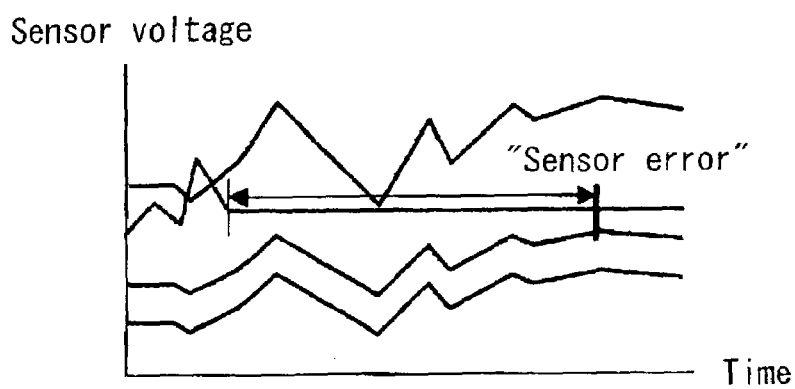

As explained above, in a series of the transaction from S19 to S24, after each variation "X" of the load detection signals $V_D$ is calculated, comparing transaction is performed based on the variation "X". At S20 or S21, when the variation "X" of one load detection signal is very smaller than the variation "X" of another load detection signal and than the predetermined threshold A, the transaction determines that the load detection signal has not varied as same with another load detection signal and that the sensor error is generated on the load detecting sensor 20 where the foregoing load detection signal is detected. Then, as shown in FIG. 8(b), the generation of the sensor error is decided.

Figure 8C:
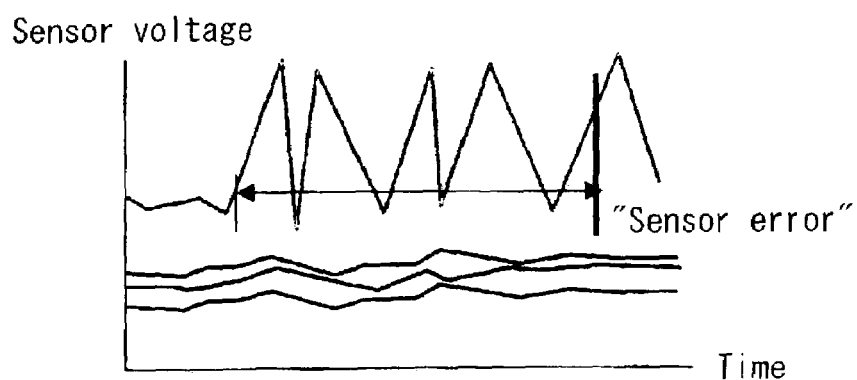

On one hand, at S22 or S23, when the variation "X" of one load detection signal is very larger than the variation "X" of another load detection signal and than the predetermined threshold B, the transaction determines that the load detection signal has not varied as same with another load detection signal and that the sensor error is generated on the load detecting sensor 20 where the foregoing load detection signal is detected. Then, as shown in FIG. 8(*c*), the generation of the sensor error is decided. That is, in the foregoing sensor error detecting transaction, the sensor error can be accurately detected by the simple comparing based on the load detection signal from the load detecting sensor 20. Thus, since the sensor error can be detected, a reliable load detection signal of the occupant can be detected. Further, when the occupant weight detecting device is applied to a safety device (for example, an air bag device), the air bag device can be accurately controlled based on the accurate load detection signal, then reliability of the safety device can be improved.

According to the present invention, when the signal processing device 21 continues to output the secondary load detection signal, the occupant weight detecting device can easily and accurately detect the error generated on the load detecting sensor 20 based on the secondary load detection signal.

Additionally, the occupant weight detecting device can easily and accurately detect the error generated on the load detecting sensor 20 based on the variation of the load detection signal detected by the load detecting sensor 20. Further, practically, the sensor error may be generated on only one load detecting sensor 20, and the occupant weight detecting device can accurately determine the foregoing sensor error.

The principles, preferred embodiments and mode of operation of the present invention have been described in the foregoing specification. However, the invention which is intended to be protected is not to be construed as limited to the particular embodiments disclosed. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. An occupant weight detecting device, comprising:
   plural load detecting means provided at a seat and outputting a load signal in response to largeness of load applied to the seat;
   a signal processing device setting an occupant load detection range in which the load applied to the seat can be detected, the signal processing device outputting a variable primary load detection signal based on the load signal in case of the load signal being within the occupant load detection range and a constant secondary load detection signal in case of the load signal being out of the occupant load detection range, a voltage of the constant secondary load detection signal being set out of a voltage range based on the variable primary load detection signal; and
   a control device to which the primary load detection signal or the secondary load detection signal is inputted, the control device outputting a control signal based on the load, wherein the control device outputs an error detection signal when the signal processing device continues to output the secondary load detection signal during predetermined time.

2. An occupant weight detecting device, comprising:
   plural load detecting means provided at a seat and outputting a load signal in response to largeness of load applied to the seat; and
   a signal processing device setting an occupant load detection range in which the load applied to the seat can be detected, the signal processing device outputting a variable primary load detection signal based on the load signal in case of the load signal being within the occupant load detection range and a constant secondary load detection signal in case of the load signal being out of the occupant load detection range, a voltage of the constant secondary load detection signal being set out of a voltage-range based on the variable primary load detection signal; and
   a control device to which the primary load detection signal or the secondary load detection signal is inputted, the control device outputting a control signal based on the load, wherein the control device calculates variation of the primary load detection signal and outputs an error detection signal when a first state in which the variation is smaller than a first predetermined threshold or a second state in which the variation is larger than a second predetermined threshold larger than the first predetermined threshold elapses during predetermined time.

3. An occupant weight detecting device, according to claim 2, wherein the control device outputs an error detection signal when the first state or the second state elapses in the one load detecting means during the predetermined time.

4. An occupant weight detecting device, according to claim 1, wherein the voltage of the constant secondary load detection signal is set to be a steady value larger than an upper limit of the voltage-range based on the variable primary load detection signal or smaller than a lower limit of the voltage-range based on the variable primary load detection signal.

5. An occupant weight detecting device, according to claim 1, wherein the signal processing device clamps the voltage of the variable primary load detection signal at an upper limit and a lower limit corresponding to the occupant load detection range.

6. An occupant weight detecting device, according to claim 1, wherein the control device checks in sequence the load signal from each load detecting means whether the signal processing device continues to output the secondary load detection signal during the predetermined time.

7. An occupant weight detecting device, according to claim 1, wherein the control device outputs the error detection signal when at least one load detecting means continue to output a load signal being out of the occupant load detection range during the predetermined time.

\* \* \* \* \*